(12) United States Patent
Muendel et al.

(10) Patent No.: US 11,619,788 B2
(45) Date of Patent: Apr. 4, 2023

(54) SHAPED FIBERS FOR EFFICIENT BEAM COMBINATION

(71) Applicant: Lumentum Operations LLC, San Jose, CA (US)

(72) Inventors: Martin H. Muendel, Oakland, CA (US); Patrick Gregg, Sunnyvale, CA (US); Richard D. Faulhaber, San Carlos, CA (US); Jeff Gregg, San Jose, CA (US); James J. Morehead, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/304,999

(22) Filed: Jun. 29, 2021

(65) Prior Publication Data
US 2022/0334327 A1 Oct. 20, 2022

Related U.S. Application Data

(60) Provisional application No. 63/201,243, filed on Apr. 20, 2021.

(51) Int. Cl.
G02B 6/42 (2006.01)
G02B 6/04 (2006.01)

(52) U.S. Cl.
CPC ............ *G02B 6/4203* (2013.01); *G02B 6/04* (2013.01)

(58) Field of Classification Search
CPC ................................ G02B 6/4203; G02B 6/04
USPC ........................................................ 385/115
See application file for complete search history.

(56) References Cited

U.S. PATENT DOCUMENTS 9,063,289 B1 *  6/2015  Farmer ................. H01S 5/4012
2020/0132936 A1 *  4/2020  Evans .................... G02B 6/262

* cited by examiner

*Primary Examiner* — Jerry M Blevins
(74) *Attorney, Agent, or Firm* — Harrity & Harrity, LLP

(57) ABSTRACT

In some implementations, a fiber optic combiner may comprise an enclosing tube having a geometric shape and multiple optical fibers bundled within the enclosing tube. In some implementations, the multiple fibers comprise at least one optical fiber having a core and a non-circular cladding surrounding the core. The non-circular cladding may cause the multiple optical fibers to have a larger tube fill factor and a lower expected beam parameter product increase factor relative to the multiple optical fibers all having circular claddings.

20 Claims, 8 Drawing Sheets

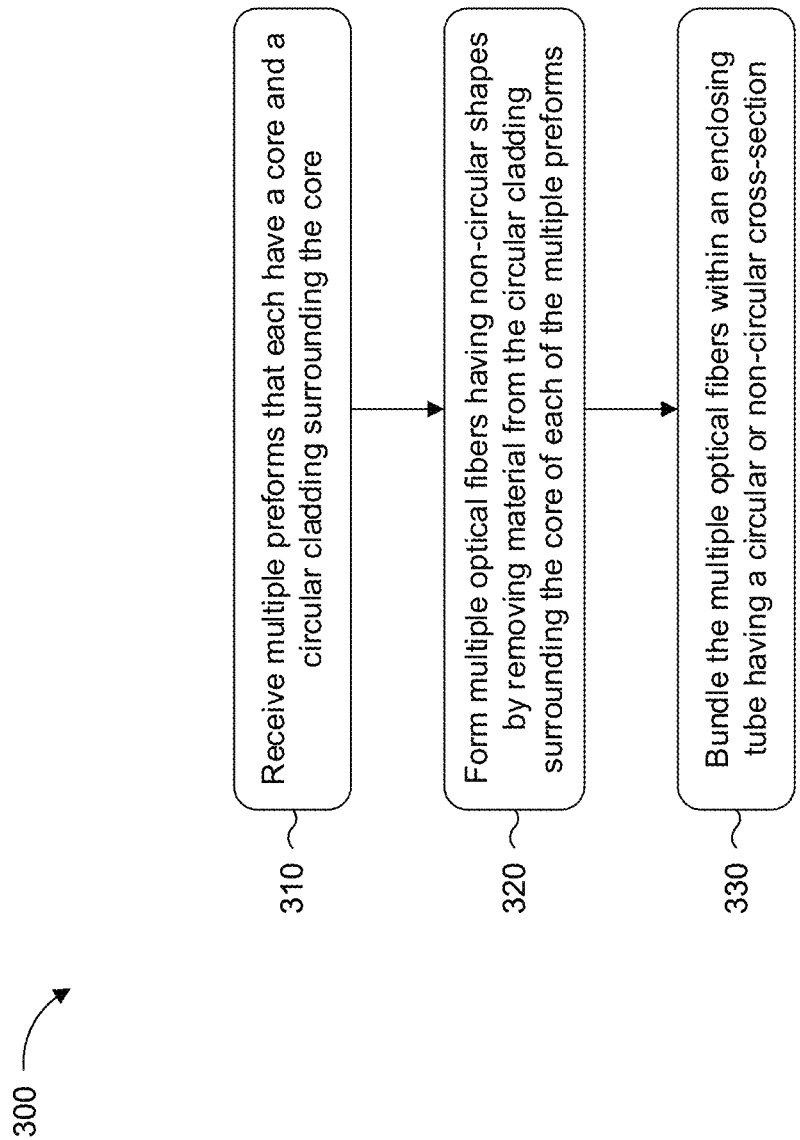

SHAPED FIBERS FOR EFFICIENT BEAM COMBINATION

CROSS-REFERENCE TO RELATED APPLICATION

This Patent Application claims priority to U.S. Provisional Patent Application No. 63/201,243, filed on Apr. 20, 2021, and entitled "SHAPED FIBERS FOR HIGH EFFICIENCY BEAM COMBINATION." The disclosure of the prior Application is considered part of and is incorporated by reference into this Patent Application.

TECHNICAL FIELD

The present disclosure relates generally to a beam combiner and to shaped optical fibers that have a non-circular cladding enabling the shaped optical fibers to be efficiently bundled within an enclosing tube.

BACKGROUND

In an optical system, beam quality generally refers to a measure of how tightly a laser beam can be focused under certain conditions (e.g., with a limited beam divergence). For example, a high beam quality implies smooth wavefronts (e.g., a strong phase correlation across the beam profile) such that focusing the beam with a lens enables the beam to be focused where the wavefronts are planar. On the other hand, a beam with poor beam quality may have scrambled wavefronts that make beam focusing more difficult (e.g., the beam divergence for a given spot size is increased). One metric that is often used to quantify beam quality is a beam parameter product (BPP), which is defined as the product of the beam radius (measured at the beam waist) and the beam divergence half-angle (measured in the far field). In general, beam quality decreases as the BPP value increases and vice versa (e.g., a higher BPP is associated with a lower beam quality and a lower BPP is associated with a high beam quality). In general, the minimum achievable BPP value is $\lambda/\pi$, which corresponds to an ideal Gaussian beam with a wavelength $\lambda$. For example, the minimum possible BPP value for a beam that has a 1064 nanometer (nm) wavelength is about 0.339 millimeters times milliradians (mm-mrad). In some cases, the BPP may remain unchanged or may increase minimally (e.g., does not become significantly worse) when a beam is sent through non-aberrative optics, such as a thin lens (e.g., if the lens generates a focus with a smaller radius or a larger radius at the beam waist, the beam divergence will increase or decrease correspondingly). However, non-ideal optics can lead to a significant increase in the BPP value, which can spoil the beam quality. For example, the BPP value can significantly increase in cases where one or more optical components cause the beam radius to increase without a corresponding decrease in the beam divergence half-angle.

SUMMARY

In some implementations, a fiber optic combiner comprises an enclosing tube having a geometric shape and multiple optical fibers bundled within the enclosing tube, wherein the multiple fibers comprise at least one optical fiber having: a core; and a non-circular cladding surrounding the core.

In some implementations, an optical assembly comprises multiple laser modules configured to emit respective beams; a feeding fiber; and a fiber optic combiner coupled between the multiple laser modules and the feeding fiber, wherein the fiber optic combiner comprises multiple optical fibers bundled within an enclosing tube, and wherein the multiple optical fibers bundled within the enclosing tube each include a core and a non-circular cladding surrounding the core.

In some implementations, a method includes receiving multiple preforms that each have a core and a circular cladding surrounding the core; forming multiple optical fibers having non-circular shapes by removing material from the circular cladding surrounding the core of each of the multiple preforms; and bundling the multiple optical fibers within an enclosing tube having a geometric shape.

BRIEF DESCRIPTION OF THE DRAWINGS

FIG. 3 is a flowchart of an example process relating to fabricating a shaped optical fiber that enables efficient beam combination.

DETAILED DESCRIPTION

The following detailed description of example implementations refers to the accompanying drawings. The same reference numbers in different drawings may identify the same or similar elements.

Various laser architectures allow a high-power laser source to be operated with a high beam quality (e.g., a high radiance or brightness). However, existing laser architectures have limitations, and some laser applications would require a higher laser power and/or brightness than appears to be feasible with any known laser technology. Another problem that arises in laser applications that require a high laser power is that high-power laser systems are developed and built in small numbers, making the devices costly. One potential solution to address the challenges and/or limitations in high-power laser systems is to use beam combining, which refers to an optical system in which the outputs from multiple laser sources (e.g., in a laser array) are combined to obtain a single output beam. Accordingly, using a scalable beam-combining technology can lead to a power-scalable laser source, even if the single lasers are not scalable.

Figure 1A:
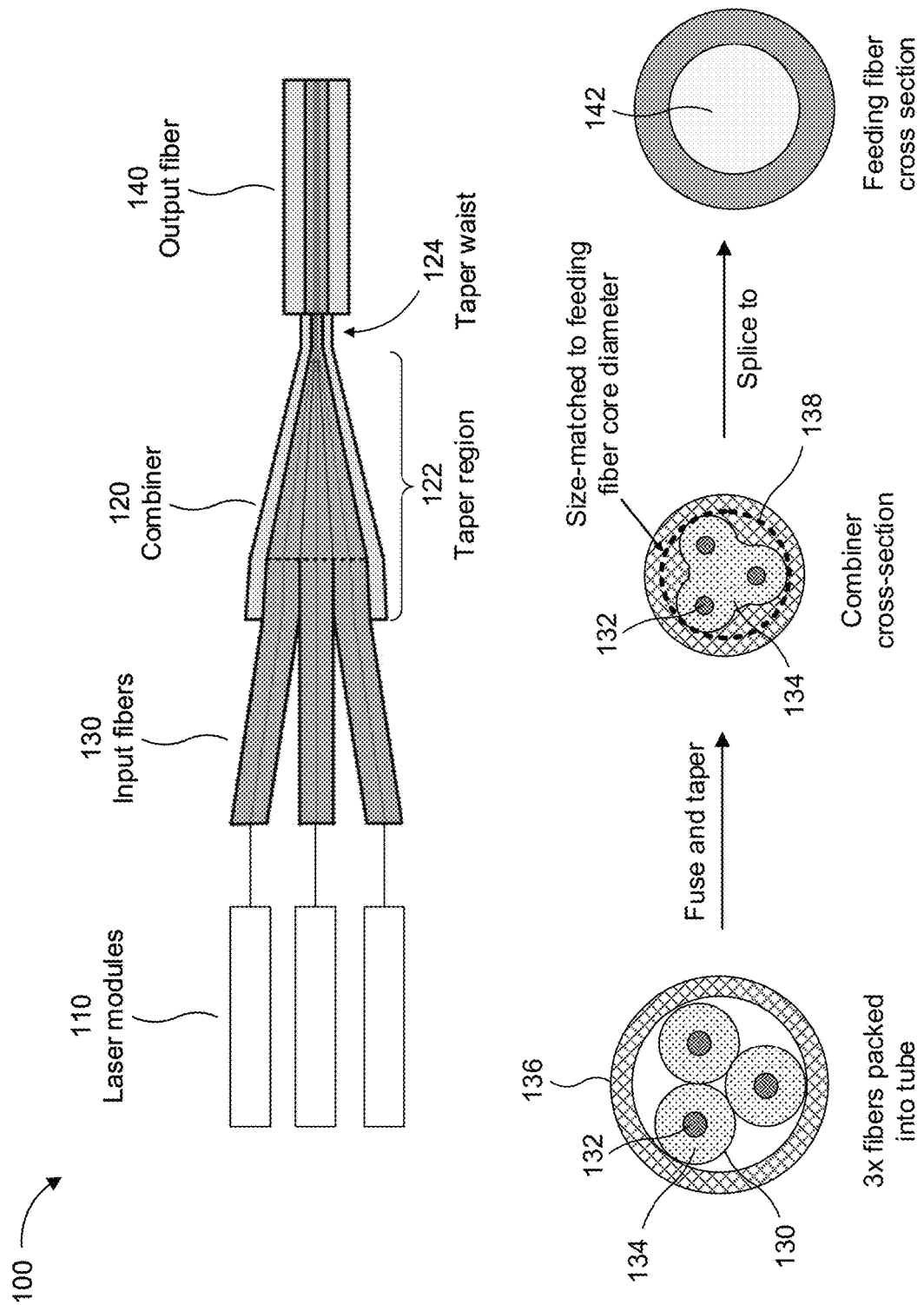
FIGS. 1A-1B are diagrams illustrating one or more examples of a beam combiner.
Figure 1B:
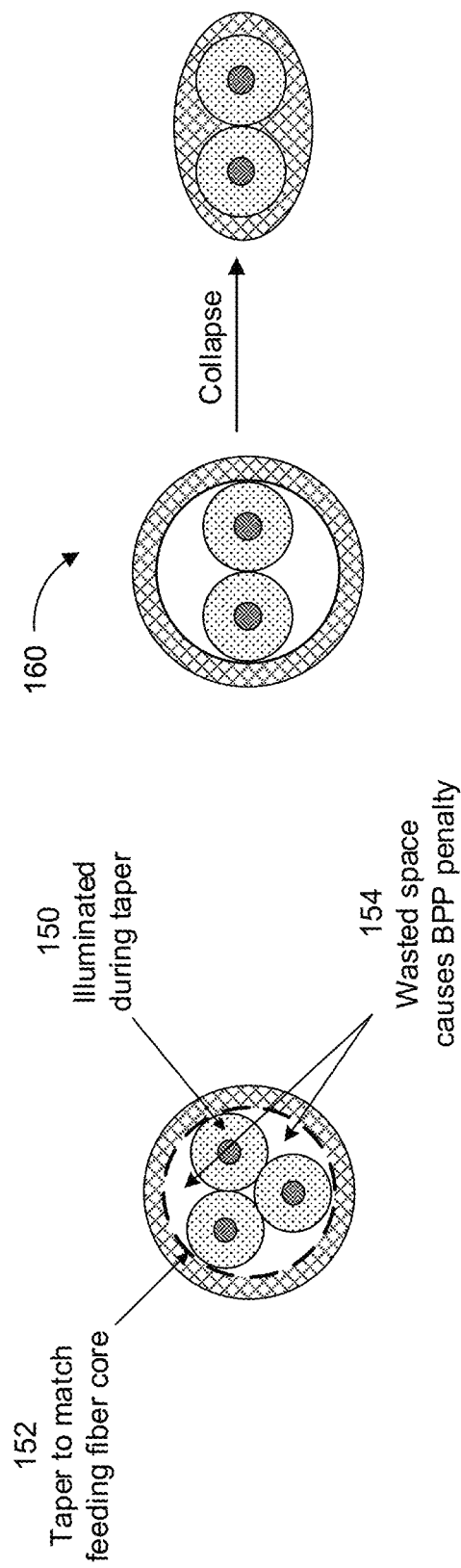

For example, FIGS. 1A-1B are diagrams illustrating one or more examples 100 of a beam combiner that can be used to scale power in multi-kilowatt (kW) fiber lasers. As shown in FIG. 1A, a laser module and combiner approach may be used to configure one or more laser modules 110 to achieve a maximum power, and multiple laser modules 110 may then be combined via a fiber optic combiner 120 to achieve a greater total system power. A common strategy used in the laser module and combiner approach is to fuse several input fibers 130 into a bundle, pack the bundle into an enclosing tube (e.g., a glass tube), and collapse the tube onto the input fibers 130. The input fibers 130 may be etched and/or tapered over a taper region 122 to achieve a target initial diameter (e.g., until the cores of the input fibers 130 are size-matched to an output fiber 140). The input fibers 130 that are fused in the bundle may then be cleaved at a taper waist 124 (e.g., a location where a diameter of the fiber optic combiner 120 is at a minimum), and the bundled input fibers 130 may then be spliced to the output fiber 140.

For example, as shown in FIG. 1A, the illustrated fiber optic combiner 120 is a 3:1 combiner in which three input fibers 130 are packed as a bundle into a glass tube or another suitable enclosing tube 136. Each input fiber 130 includes a circular core 132 and a circular cladding 134 surrounding the circular core 132. The assembly may then be fused and tapered, which causes light to leak from the cores 132 into the respective claddings 134. Accordingly, a fused cladding 134 is illuminated by light leaving the laser modules 110. As further shown in FIG. 1A, the fused and tapered assembly is size-matched in diameter to a core 142 of the output fiber 140 (e.g., a target feeding fiber). The combiner bundle and the output fiber 140 are then spliced, completing the fiber optic combiner 120. Alternatively, the input fibers 130 (e.g., output fibers from the laser modules 110) may be etched and fused, but not tapered. In such cases, light may remain in the cores 132 of the input fibers 130 and the core diameter of the output (feeding) fiber 140 is matched to the fused cladding 138 that encloses the cores 132. For specificity, some implementations may be described herein with reference to only the tapered case, but it will be appreciated that implementations described herein also apply to etch and fuse cases.

In an optical assembly or optical system that uses beam combining, one design goal is to multiply the output power, but another important design objective is to preserve beam quality such that radiance is increased nearly as much as the output power. Accordingly, in an optical system that uses the laser module and combiner approach shown in FIG. 1A, a typical objective is to combine the laser modules 110 such that a beam parameter product (BPP) increases as little as possible and no power is lost. For example, as described above, BPP generally refers to the product of a beam radius and a beam divergence angle. The BPP is similar or analogous to entropy, in that beams with a lower BPP are preferred for most material processing applications. Furthermore, BPP is typically easy to increase and difficult or impossible to decrease.

In an optical system where N laser modules 110 are combined, a theoretically perfect combiner 120 will increase the output BPP as $\sqrt{N}$ times the BPP of the individual input laser modules 110. Qualitatively, the BPP increase occurs because the total beam area increases N times while the divergence angle is maintained, and BPP scales as the square root of area. A perfect combiner 120 will match exactly the combined beam area of the input optical fibers 130 from the laser modules 110, and the feeding fiber 140 to which the combiner 120 is spliced. In contrast, in the 3:1 combiner shown in FIG. 1A, the core 142 of the receiving feeding fiber 140 has a greater area than the beams being combined. The total beam area of the incoming light is 3x the area of the claddings 134 of the input fibers 130, while the area of the core 142 of the receiving feeding fiber 140 is determined by a circle that encloses all of the incoming beams. For example, as shown in FIG. 1B, reference number 150 indicates the total beam area of the incoming light that is illuminated during the taper (e.g., the combined areas of the claddings 134 of the input fibers 130 that are bundled in the combiner 120), and reference number 152 indicates the area of the circle that encloses all of the incoming beams, which is tapered to match the core 142 of the receiving feeding fiber 140. Accordingly, as further shown in FIG. 1B, reference number 154 shows air gaps (e.g., unoccupied space) between and around the input fibers 130, which indicate how much the beam area will increase in the splice between the combiner 120 and the feeding fiber 140, with a consequent increase in BPP (e.g., a BPP penalty) due to the rapid increase in the beam radius without a corresponding decrease in the beam divergence. This occurs regardless of whether the air gaps 154 are sealed along the combiner via softening and collapse of the enclosing tube 136, or whether the air gaps 154 remain unsealed along the combiner. The increase in BPP may significantly degrade the beam quality, as a beam with a low BPP (e.g., a small beam radius and a low divergence) typically focuses better and stays focused for a longer distance (e.g., is closer to an ideal beam).

Accordingly, in an N:1 beam combiner (where N is greater than or equal to two), performance generally improves as the input fibers 130 are more efficiently bundled or otherwise packed into the space to be spliced onto the core 142 of the feeding fiber 140. Correlatively, performance generally decreases when the input fibers 130 are inefficiently packed into the space to be spliced onto the core 142 of the feeding fiber 140. The problem of decreasing performance for inefficiently packed input fibers 130 is worst for 2:1 combiners, which have the least efficient packing of any circle-in-circle geometry (e.g., where one or more unit circles are inscribed within the smallest possible larger circle). For example, optimally fitting two circular input fibers 130 into an enclosing tube 136 having a circular cross-section results in a fill factor (or fill density) of 0.5 or 50%. Accordingly, simply packing two input fibers 130 into a circular tube 136 results in at least a 2x increase in the BPP, compared to the theoretical best case of $\sqrt{2} \approx 1.4$. Moreover, as shown by reference number 160, a 2:1 combiner has a highly elliptical shape when the tube 136 is collapsed and/or when the bundle is fused, which makes handling and/or splicing to a circular feeding fiber 140 more difficult.

Some implementations described herein relate to combining shaped fibers that have non-circular claddings, which allows more efficient packing into an enclosing tube by reducing dead (e.g., unoccupied) space within the enclosing tube. For example, as described herein, a shaped optical fiber may include a core and a non-circular cladding surrounding the core, where a shape or geometry of the non-circular cladding is based on a quantity of the shaped optical fibers to be bundled within an enclosing tube that may have a geometric shape. For example, in the case of a 2:1 fiber optic combiner, two shaped fibers may have a D-shaped cladding that allows the tube to be filled more efficiently (e.g., the D-shaped cladding is nearly circular with a flattened edge). For example, the D-shaped cladding may be quantified by a flat depth parameter, which may have a value equal to a difference between an outer radius of the shaped fiber and a distance from a center of the shaped fiber to a flattened edge of the shaped fiber. More generally, the non-circular cladding has a shape quantified by one or more parameters that define one or more removed portions of a perfect circle to achieve a target shape of the non-circular cladding. For example, a 4:1 fiber optic combiner may bundle four (4) shaped fibers that each have a quarter-circle geometry, or a 6:1 fiber optic combiner may bundle six (6) shaped fibers that each have a triangular geometry. In general, the geometry of the shaped fibers may result in an increased tube fill factor by reducing the area in the tube that is unoccupied. As a result, the increased tube fill factor may decrease the extent to which the beam area increases at the splice between the combiner and a feeding fiber, which decreases a BPP increase factor (e.g., a measure of the BPP increase that occurs at the splice between the combiner and the feeding fiber), thereby improving performance.

FIGS. 2A-2E are diagrams illustrating one or more example implementations 200 of a shaped optical fiber that enables efficient beam combination. In some implementations, the shaped optical fiber may be used in a fiber optic combiner that includes multiple optical fibers bundled within an enclosing tube (e.g., in an optical system or optical assembly where the fiber optic combiner is arranged between multiple laser modules and an output feeding fiber to scale power to multi-kW levels, as described in more detail above with reference to FIGS. 1A-1B).

Figure 2A:
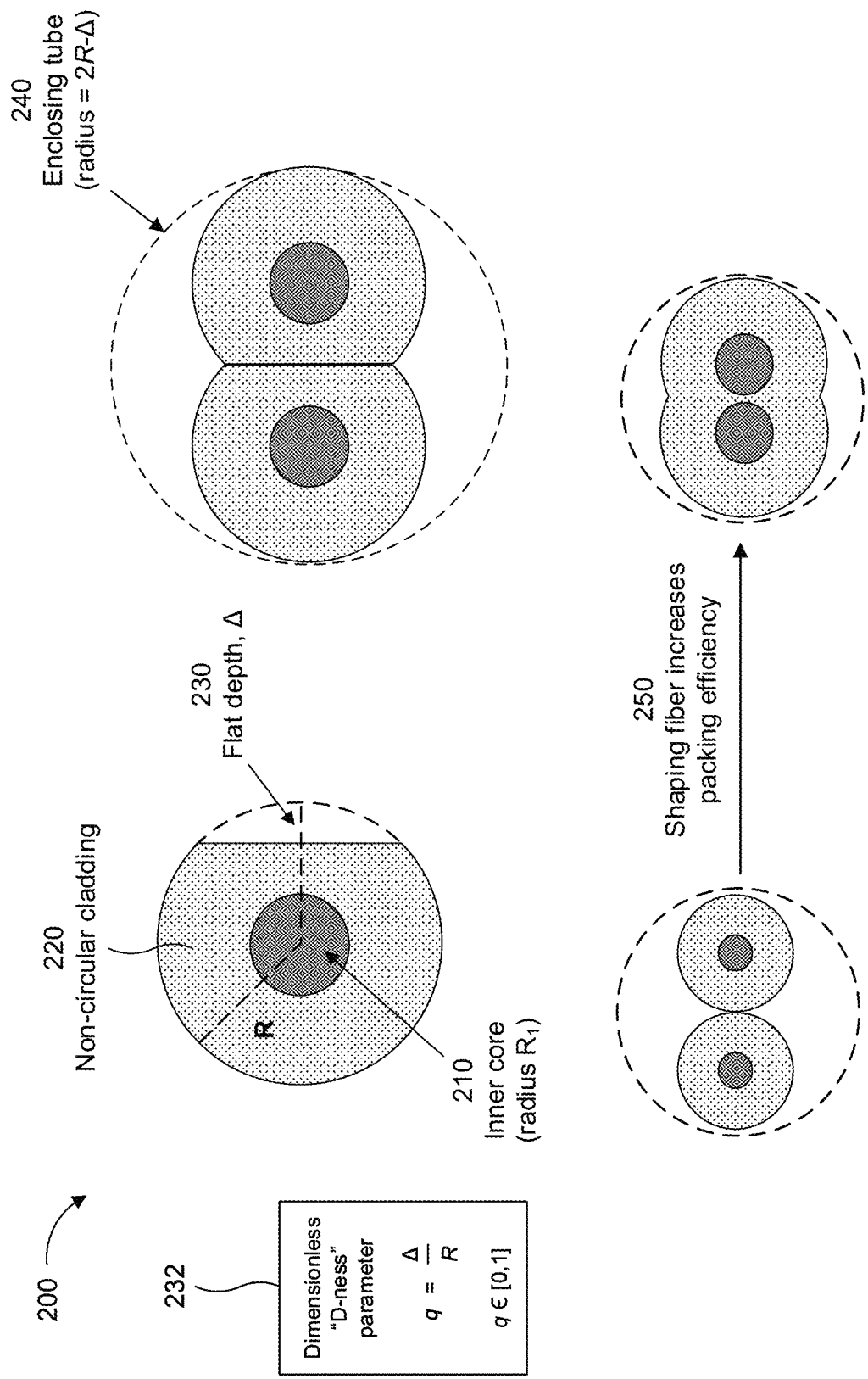
FIGS. 2A-2E are diagrams illustrating one or more example implementations of a shaped optical fiber that enables efficient beam combination

As shown in FIG. 2A, a shaped optical fiber may include a circular inner core 210 that has a first radius, $R_1$, and a non-circular cladding 220 that surrounds the inner core 210 and has a second radius, R. Alternatively, in some aspects, the inner core 210 may have a non-circular (e.g., elliptical) shape. In some implementations, the shaped optical fiber illustrated in FIG. 2A may be used in a 2:1 fiber optic combiner, whereby the non-circular cladding 220 may have a D-shaped geometry to enable two shaped fibers to fill an enclosing tube (e.g., a glass tube that is open at both ends) more efficiently than two optical fibers that have circular shapes. In some implementations, the enclosing tube may have a geometric shape, which may be any suitable shape in which the cross-section of the enclosing tube includes an air hole that may be any closed shape (e.g., a circle, rectangle, ellipse, hexagon, and/or banana, among other examples) that is suitable for a particular application or system design.

In some implementations, the D-shaped geometry of the non-circular cladding 220 may be nearly circular with a flattened edge. For example, as shown in FIG. 2A, the D-shape of the non-circular cladding 220 may be quantified by a flat depth parameter 230, Δ, which is based on a removed portion of the radius of the shaped optical fiber. For example, as shown in FIG. 2A, the flat depth parameter 230 has a value equal to a difference between R (the radius of the non-circular cladding 220) and a distance from a center of the inner core 210 to the flattened edge of the shaped optical fiber. Additionally, or alternatively, as shown by reference number 232, the shape of the non-circular cladding 220 may be quantified by a dimensionless "D-ness" parameter, q, which has a value equal to a ratio between Δ (the value of the flat depth parameter 230) and R (the radius of the non-circular cladding 220), where q has a value between zero (0) and one (1). Accordingly, as shown by reference number 240, an enclosing tube into which two D-shaped optical fibers are packed may have a minimally enclosing radius of 2R- Δ.

In this way, as shown by reference number 250, shaping the optical fiber to have a non-circular cladding 220 may increase packing efficiency within the enclosing tube, which improves performance by reducing the BPP increase that is expected to occur at a splice between the tube bundling the shaped optical fibers and an output feeding fiber. For example, relative to two circular optical fibers, two shaped optical fibers that have non-circular (e.g., D-shaped) claddings 220 may occupy a larger portion of the space within the tube, which decreases the BPP penalty expected to occur at the splice between the enclosing tube and the output feeding fiber. As described herein, the portion of the space within the tube that is occupied by the shaped optical fibers may be referred to as an tube fill factor, and the BPP penalty expected to occur at the splice between the tube and the output feeding fiber may be referred to as an expected BPP increase factor. In general, packing becomes more efficient (the tube fill factor increases) as the non-circular cladding 220 becomes more D-shaped.

Figure 2B:
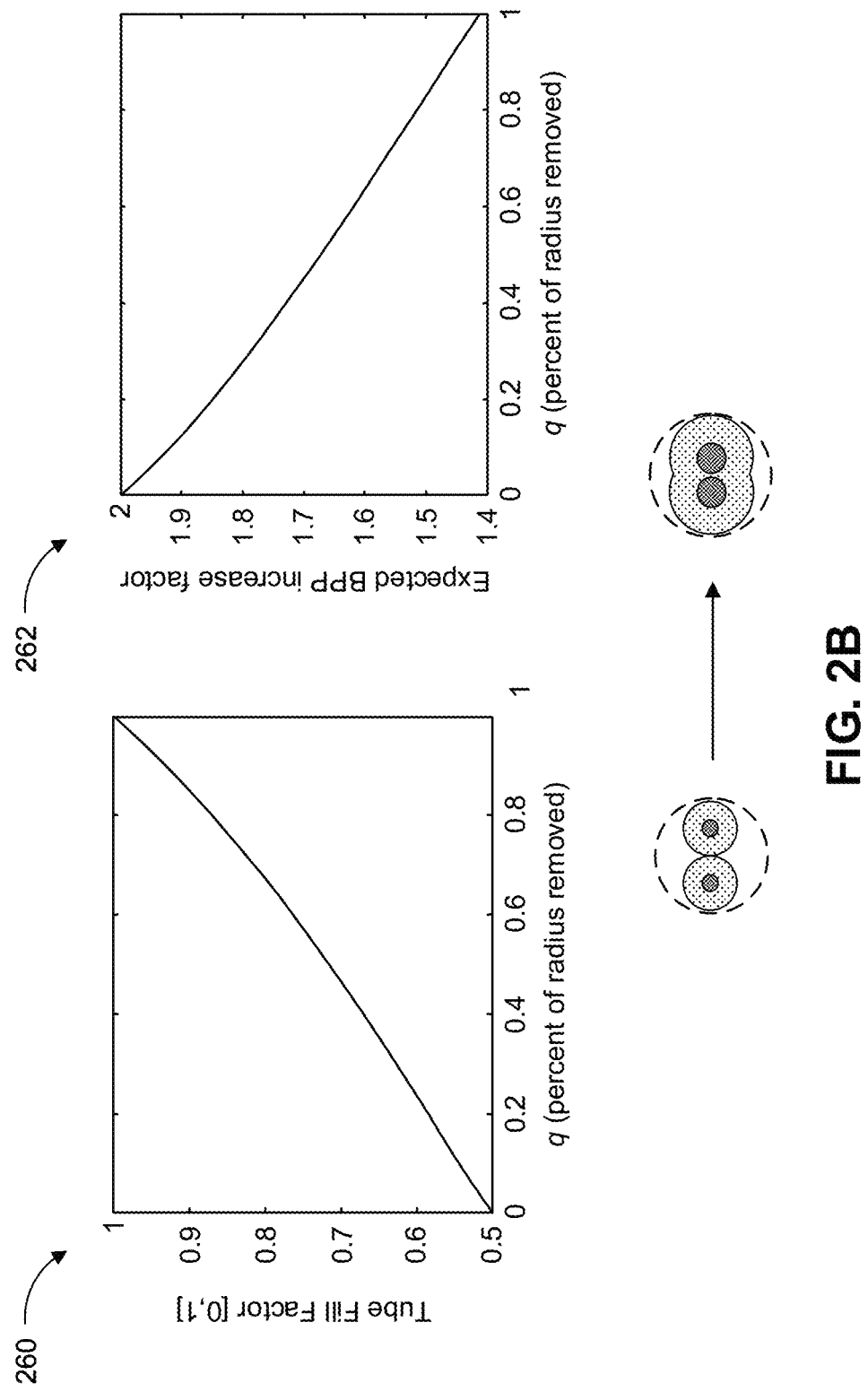

For example, FIG. 2B is a diagram illustrating example plots 260, 262 related to increased efficiency and improved beam quality associated with a shaped optical fiber. As shown in FIG. 2B, and by plot 260, the tube fill factor may refer to a percentage of the area inside the tube that is filled with glass. As shown, the value of the flat depth parameter 230 increases (resulting in a larger q value) as the non-circular cladding 220 becomes more D-shaped, which causes the tube fill factor to increase and approach one (1) when the flat depth parameter 230 equals R, which theoretically results in two semi-circles that can occupy all the space within a tube having a circular cross-section. In practice, however, the extreme case of a semi-circular optical fiber might not be used because of the presence of the inner core 210, which limits the tube fill factor to ~0.8 when the tube has a circular cross-section (e.g., a value of the flat depth parameter, Δ, may be limited to $R-R_1$, where $R_1$ is the radius of the inner core 210) and the inner core 210 is concentric with the cladding 220. In some implementations, the shaped optical fiber may include an inner core 210 that is non-concentric with respect to the cladding 220, which enables a fill factor of one (1). Furthermore, as shown in FIG. 2B, and by plot 262, the expected BPP increase factor decreases as the fiber becomes more D-shaped (e.g., as the value of q increases), whereby a larger q value improves performance because the rate at which BPP increases is lower at larger q values. In this way, because the BPP increases as the square root of the increase in area, or one over the square root of the tube fill factor, shaping the optical fiber to be more D-shaped (e.g., having a larger flat depth in the case of a 2:1 combiner) enables a higher brightness combiner. Furthermore, as shown, shaping two optical fibers to have a D-shape (e.g., a q value greater than zero) may have a higher tube fill factor and a lower expected BPP increase factor relative to a combiner that bundles two circular fibers (e.g., a q of zero).

Figure 2C:
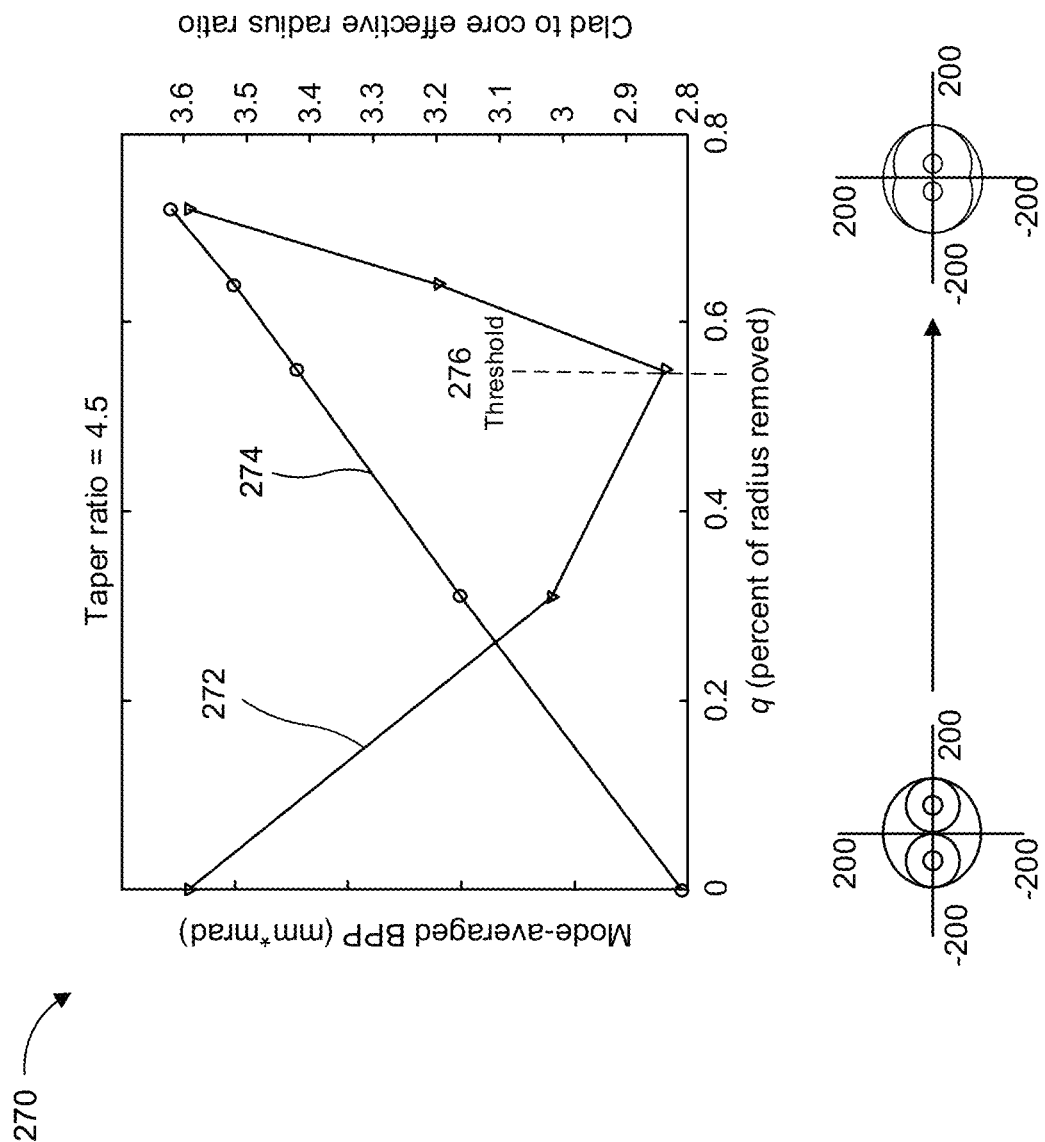

In some implementations, another factor that impacts the performance of a combiner is taper geometry (e.g., a taper ratio and/or a taper length). For example, as described above, a combiner that bundles multiple optical fibers may be tapered from an input end of an tube to an output end of the tube, and the taper ratio of the combiner may refer to the ratio of the starting diameter to the final diameter (e.g., the ratio of the inside diameter of the tube before tapering to the inside diameter of the tube after tapering). Efficient tapers are adiabatic, which preserve BPP (e.g., reduce the expected BPP increase factor), because the change in size is slow enough that light can gradually and smoothly leak from core to cladding. In contrast, non-adiabatic tapers are abrupt, and can cause BPP to increase in a similar manner as occurs at a splice between two fibers that have different sizes. In addition to the taper ratio and the taper length, adiabaticity is determined by a ratio of the cladding diameter to the core diameter (e.g., how much the light beam changes size). A larger cladding diameter to core diameter ratio requires a longer taper length to be adiabatic. For a combiner, the taper ratio determines the inner diameter of the enclosing tube, because the tube is typically mated to the feeding fiber core diameter at the taper waist (e.g., a location where the taper is at a minimum). As fibers are made more and more D-shaped (larger flat depth Δ, larger q), the fiber radius R is increased to fill the inside diameter of the tube, increasing the ratio of the cladding diameter to the core diameter. Practically, system design constraints limit the taper length to several tens of millimeters. Under this constraint, making the fiber more D-shaped beyond some critical point will actually increase the BPP, due to a non-adiabatic taper. For example, FIG. 2C illustrates an example plot 270 that includes a first curve 272 to represent a mode-averaged BPP (in millimeter times milliradians (mm-mrad)) as a function of q, and a second curve 274 to represent a clad-to-core effective radius ratio as a function of q. As shown by curve 272, based on a taper ratio of 4.5, the BPP decreases as the fiber is made more and more D-shaped (e.g., resulting an increase in the clad-to-core ratio, keeping the same final inner diameter of the tube) until the value of q satisfies a threshold 276. Above the threshold 276, making the fiber more D-shaped results in a BPP increase due to a non-adiabatic taper. Accordingly, as shown, the taper geometry (e.g., taper ratio and taper length) may determine the optimal value of the flat depth parameter based on the clad-to-core effective radius ratio.

Figure 2D:
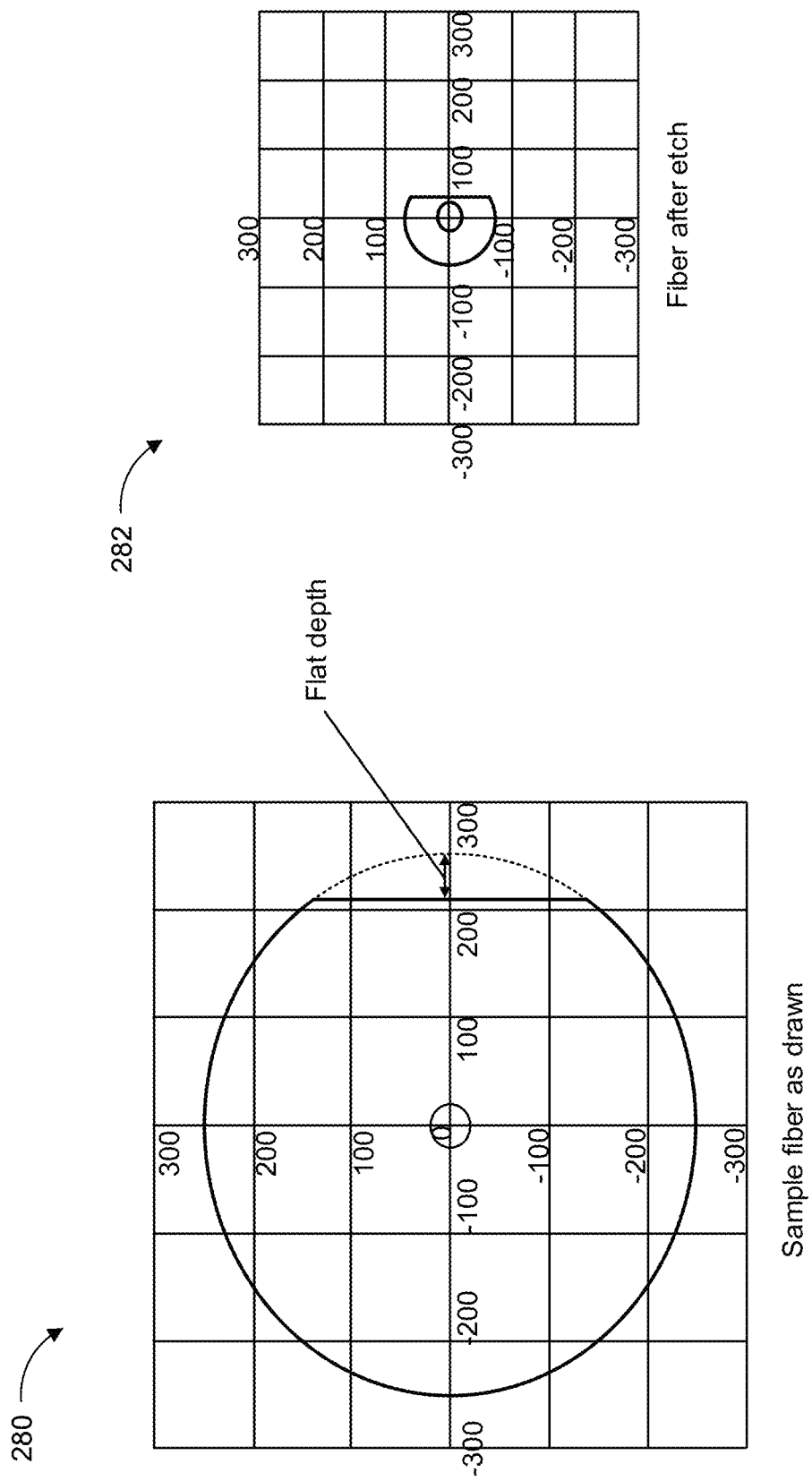

In this way, by shaping an optical fiber such that a core 210 is surrounded by a non-circular cladding 220 (e.g., a D-shaped cladding in the case of a 2:1 combiner), the value of the flat depth parameter 230 does not change when the fiber is etched. Typically for such combiners, the fiber is drawn at a 400-500 micrometer (μm) cladding diameter and etched to an 80-150 μm cladding diameter before being bundled and enclosed in a tube. As a result, a small value can be chosen for the flat depth parameter relative to the nominal outer diameter (e.g., a flat depth of 50 μm on a 500 μm diameter fiber). Thus, as shown in FIG. 2D, an unetched fiber is mostly circular, and can be easily spliced to a circular fiber leaving a laser module. When the fiber is etched, the fiber becomes more D-shaped (e.g., the value of the flat depth parameter 230 is unchanged but the radius decreases, which causes q to increase) for more efficient packing. As shown in FIG. 2D, and by reference number 280, a technique to manufacture or fabricate a D-shaped fiber may start with grinding one edge of a circular preform back to a target flat depth. Additionally, or alternatively, the one edge of the circular preform may be ablated away to the target flat depth with carbon dioxide ($CO_2$) laser material removal, selective etching, or another suitable material removal process. As further shown in FIG. 2D, and by reference number 282, the fiber may be machined into a D-shape after being drawn, via targeted laser material removal or another suitable technique. Additionally, or alternatively, a circular fiber may be drawn and shaped (e.g., using laser ablation or selective etching) at a fiber scale to achieve a desired shape and/or target diameter for the non-circular cladding 220 in one step. In this way, because the input fibers to the fiber optic combiner are circular, the input fibers may easily splice to the input laser modules.

Figure 2E:
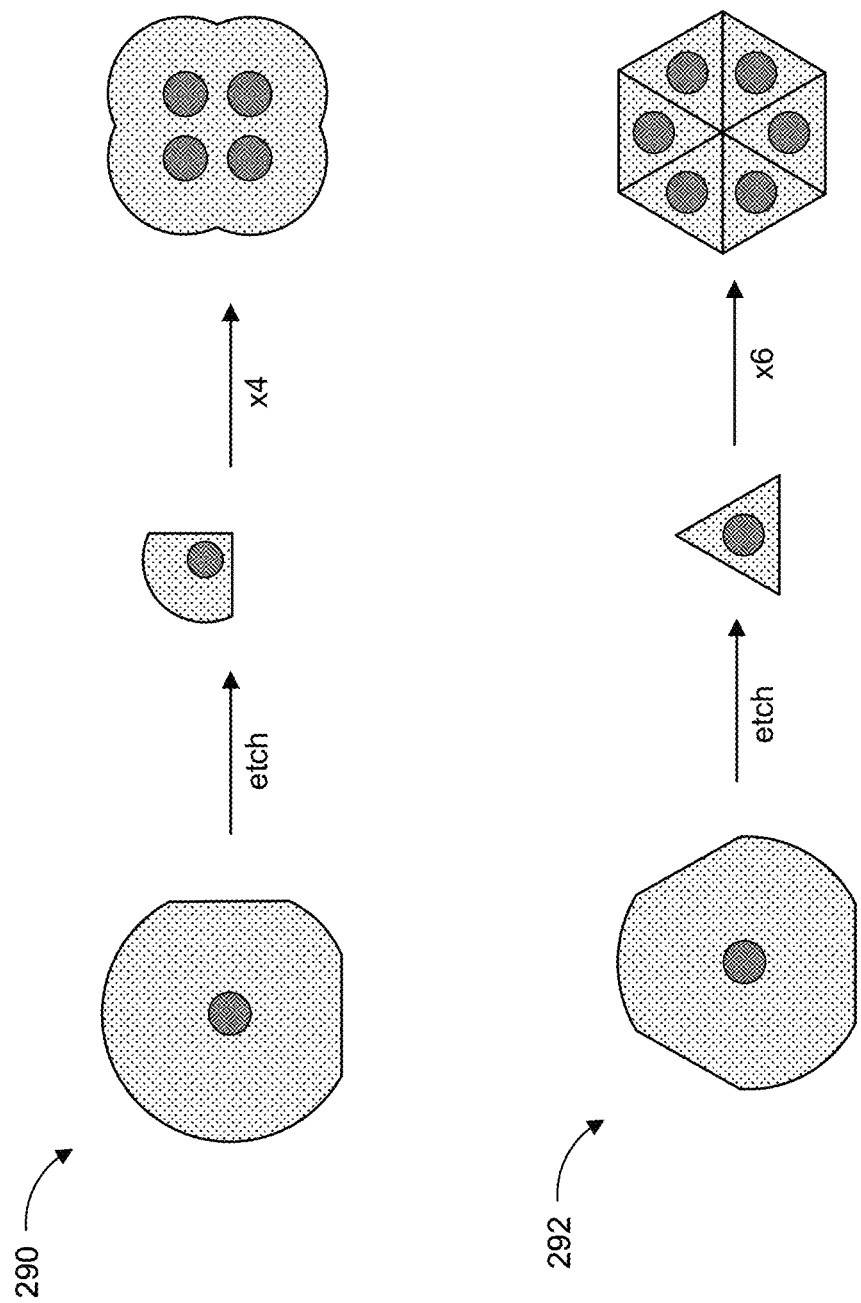

Similarly, for other combiner geometries, shaping fibers may enable higher brightness beam combinations. For example, the shape or geometry of the non-circular cladding may generally depend on the number of optical fibers to be bundled within the tube, where FIGS. 2A-2D describe a D-shaped optical fiber suitable for use in a 2:1 combiner. More generally, the non-circular cladding 220 has a shape quantified by one or more parameters that define one or more removed portions of a perfect circle to achieve a target shape of the non-circular cladding 220. For example, FIG. 2E illustrates an example 290 of a 4:1 combiner, where material at two edges of a circular optical fiber may be removed, and the optical fiber may then be etched to form a shaped optical fiber that has an approximately quarter-circle shape. Four shaped optical fibers can then be bundled within an enclosing tube to form a 4:1 combiner, which may have a greater tube fill factor and a lower expected BPP increase factor relative to a 4:1 combiner that bundles four circular fibers. Additionally, FIG. 2E illustrates an example 292 of a 6:1 combiner, where material at three edges of a circular optical fiber may be removed, and the optical fiber may then be etched to form a shaped optical fiber that has a triangular shape. Six shaped optical fibers can then be bundled within an enclosing tube to form a 6:1 combiner, which may have a greater tube fill factor and a lower expected BPP increase factor relative to a 6:1 combiner that bundles six circular fibers. In general, gains on packing efficiency via shaping optical fibers to have non-circular claddings may decrease with the number of combined fibers, with N=2 experiencing the most improvement, although shaping the fiber cladding may allow atypical combiner configurations (e.g., N=6) that are otherwise difficult to pack and/or associated with poor packing efficiency.

As indicated above, FIGS. 2A-2E are provided as examples. Other examples may differ from what is described with regard to FIGS. 2A-2E. For example, although some implementations are described herein with respect to the enclosing tube, feeding fiber, and/or inner core having circular geometries, in some implementations, one or more of the enclosing tube, the feeding fiber, and/or the inner core may have a non-circular (e.g., elliptical) geometry, where the geometry of the enclosing tube may generally be matched to the geometry of the feeding fiber. Furthermore, as described herein, the number and arrangement of components shown in FIGS. 2A-2E are provided as examples. In practice, there may be additional components, fewer components, different components, or differently arranged components than shown in FIGS. 2A-2E. Furthermore, two or more components shown in FIGS. 2A-2E may be implemented within a single component, or a single component shown in FIGS. 2A-2E may be implemented as multiple, distributed components. Additionally, or alternatively, a set of components shown in FIGS. 2A-2E may perform one or more functions described as being performed by another set of components shown in FIGS. 2A-2E.

FIG. 3 is a flowchart of an example process 300 relating to fabricating a shaped optical fiber that enables efficient beam combination.

As shown in FIG. 3, process 300 may include receiving multiple preforms that each have a core and a circular cladding surrounding the core (block 310). As further shown in FIG. 3, process 300 may include forming multiple optical fibers having non-circular shapes by removing material from the circular cladding surrounding the core of each of the multiple preforms (block 320). As further shown in FIG. 3, process 300 may include bundling the multiple optical fibers within an enclosing tube having a geometric shape (block 330). For example, in some implementations, the geometric shape of the enclosing tube may include a cross-section with an closed region of air (e.g., an air hole) that can be any closed shape (e.g., a circle, rectangle, ellipse, hexagon, and/or banana) and one or more regions of an enclosing material that surround the closed region of air.

Process 300 may include additional implementations, such as any single implementation or any combination of implementations described below and/or in connection with one or more other processes described elsewhere herein.

In a first implementation, the material is removed from the circular cladding of each of the multiple preforms to a flat depth having a value equal to a difference between radii of the multiple preforms and distances from centers of the multiple preforms to respective flattened edges of the multiple preforms.

In a second implementation, alone or in combination with the first implementation, process 300 includes splicing the multiple optical fibers to circular fibers at respective outputs from multiple laser modules, and etching the multiple optical fibers to reduce radii of the multiple optical fibers without causing a change to the value of the flat depth, wherein the splicing and the etching occur prior to bundling the multiple optical fibers within the enclosing tube.

In a third implementation, alone or in combination with one or more of the first and second implementations, process 300 includes drawing one or more circular fibers and shaping the one or more circular fibers via laser ablation or selective etching to achieve the non-circular shapes of the multiple optical fibers.

In a fourth implementation, alone or in combination with one or more of the first through third implementations, the multiple optical fibers with the non-circular shapes may be used in a fiber optic combiner, which may be coupled between multiple laser modules that are configured to emit respective beams and a feeding fiber. For example, as described above, the fiber optic combiner may include multiple optical fibers that are bundled within an enclosing tube, and each optical fiber bundled within the enclosing tube may have a core and a non-circular cladding surrounding the core. Furthermore, in some implementations, an output end of the enclosing tube may be size-matched and/or shape-matched to a core of the feeding fiber that is coupled to the output end of the enclosing tube.

In a fifth implementation, alone or in combination with one or more of the first through fourth implementations, the non-circular claddings of the multiple optical fibers may cause the multiple optical fibers to have a larger enclosing tube fill factor and a lower expected BPP increase factor relative to the multiple optical fibers all having circular claddings (e.g., based on the multiple optical fibers occupying a larger percentage of the area or space within the enclosing tube).

In a sixth implementation, alone or in combination with one or more of the first through fifth implementations, the non-circular claddings have a shape that is quantified by one or more parameters that define one or more removed portions of a perfect circle to achieve a target shape of the non-circular cladding (e.g., the shape of the non-circular cladding may be D-shaped, or circular with a flattened edge, and the one or more parameters may include a flat depth parameter having value equal to a difference between the radius of an optical fiber and a distance from a center of the optical fiber to the flattened edge).

In a seventh implementation, alone or in combination with one or more of the first through sixth implementations, the value of the flat depth parameter may be based on a taper ratio (e.g., a ratio of an inner diameter of the enclosing tube at an input end of the enclosing tube to an inner diameter of the enclosing tube at an output end of the enclosing tube) and/or a taper length (e.g., a length over which the enclosing tube tapers from the input end to the output end).

In an eighth implementation, alone or in combination with one or more of the first through seventh implementations, the enclosing tube has an inner radius that is based on radii of the multiple optical fibers and a value of the flat depth parameter.

In a ninth implementation, alone or in combination with one or more of the first through eighth implementations, a geometry of the multiple optical fibers is based on a quantity of the multiple optical fibers bundled within the enclosing tube.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:
1. A fiber optic combiner, comprising:
an enclosing tube having a geometric shape; and multiple optical fibers bundled within the enclosing tube,
  wherein the multiple optical fibers comprise at least one optical fiber having:
    a core; and
    a non-circular cladding surrounding the core,
      wherein the non-circular cladding has a shape quantified by one or more parameters,
      wherein the shape of the non-circular cladding is nearly circular with a flattened edge, and
      wherein the one or more parameters include a flat depth parameter having a value equal to a difference between a radius of the at least one optical fiber and a distance from a center of the at least one optical fiber to the flattened edge.

2. The fiber optic combiner of claim 1, wherein the one or more parameters define one or more removed portions of a circle to achieve a target shape of the non-circular cladding.

3. The fiber optic combiner of claim 1, wherein the enclosing tube has an inner radius equal to a difference between radii of the multiple optical fibers and the value of the flat depth parameter.

4. The fiber optic combiner of claim 1, wherein the value of the flat depth parameter is based on one or more of a ratio of a first inner diameter of the enclosing tube at an input end of the enclosing tube to a second inner diameter of the enclosing tube at an output end of the enclosing tube or a length from the input end of the enclosing tube to the output end of the enclosing tube.

5. The fiber optic combiner of claim 1, wherein the non-circular cladding has a geometry that is based on a quantity of the multiple optical fibers bundled within the enclosing tube.

6. The fiber optic combiner of claim 1, wherein the non-circular cladding causes the multiple optical fibers to have a larger tube fill factor and a lower expected beam parameter (BPP) product increase factor relative to the multiple optical fibers all having circular claddings.

7. The fiber optic combiner of claim 6, wherein the tube fill factor and the expected BPP increase factor are based on an area in the enclosing tube occupied by the multiple optical fibers.

8. The fiber optic combiner of claim 1, wherein the enclosing tube tapers from an input end of the enclosing tube to an output end of the enclosing tube.

9. The fiber optic combiner of claim 1, wherein an output end of the enclosing tube is size-matched to a core diameter of a feeding fiber coupled to the output end of the enclosing tube.

10. The fiber optic combiner of claim 1, wherein a first portion of the non-circular cladding is nearly circular with the flattened edge, and
  wherein a second portion of the non-circular cladding is triangular with three flattened edges.

11. An optical assembly, comprising:
  multiple laser modules configured to emit respective beams;
  a feeding fiber; and
  a fiber optic combiner coupled between the multiple laser modules and the feeding fiber,
    wherein the fiber optic combiner comprises multiple optical fibers bundled within an enclosing tube,
    wherein the multiple optical fibers bundled within the enclosing tube each include a core and a non-circular cladding surrounding the core,
    wherein the non-circular cladding has a shape quantified by one or more parameters,
    wherein the shape of the non-circular cladding is triangular with three flattened edges, and
    wherein the one or more parameters include a flat depth parameter having a value equal to a difference between a radius of an optical fiber of the multiple optical fibers and a distance from a center of the optical fiber to at least one of the three flattened edges.

12. The optical assembly of claim 11, wherein the non-circular cladding has a geometry that is based on a quantity of the multiple optical fibers bundled within the enclosing tube.

13. The optical assembly of claim 11, wherein the non-circular cladding causes the multiple optical fibers to have a larger tube fill factor and a lower expected beam parameter product increase factor relative to the multiple optical fibers all having circular claddings.

14. The optical assembly of claim 11, wherein the one or more parameters define one or more removed portions of a circle to achieve a target shape of the non-circular cladding.

15. The optical assembly of claim 14, wherein the flat depth parameter has a value based on a ratio of a first inner diameter of the enclosing tube at an input end of the enclosing tube to a second inner diameter of the enclosing tube at an output end of the enclosing tube.

16. The optical assembly of claim 14, wherein the flat depth parameter has a value based on a length from an input end of the enclosing tube to an output end of the enclosing tube.

17. A method, comprising:
  receiving multiple preforms that each have a core and a circular cladding surrounding the core;
  forming multiple optical fibers having non-circular shapes by removing material from the circular cladding surrounding the core of each of the multiple preforms; and
  bundling the multiple optical fibers within an enclosing tube having a geometric shape,
    wherein, after removing the material from the circular cladding, the multiple optical fibers have non-circular cladding having a shape quantified by one or more parameters,
    wherein the shape of the non-circular cladding is nearly circular with at least one flattened edge, and
    wherein the one or more parameters include a flat depth parameter having a value equal to a difference between a radius of an optical fiber of the multiple optical fibers and a distance from a center of the optical fiber to the at least one flattened edge.

18. The method of claim 17, wherein the material is removed from the circular cladding of each of the multiple preforms to a flat depth having a value equal to a difference between radii of the multiple preforms and distances from centers of the multiple preforms to respective flattened edges of the multiple preforms.

19. The method of claim 18, further comprising:
  splicing the multiple optical fibers to circular fibers at respective outputs from multiple laser modules; and
  etching the multiple optical fibers to reduce radii of the multiple optical fibers without causing a change to the value of the flat depth, wherein the splicing and the etching occur prior to bundling the multiple optical fibers within the enclosing tube.

20. The method of claim 17, wherein forming the multiple optical fibers includes:

drawing one or more circular fibers and shaping the one or more circular fibers via laser ablation or selective etching to achieve the non-circular shapes of the multiple optical fibers.

* * * * *